United States Patent [19]
Gibney, Sr.

[11] Patent Number: 5,377,444
[45] Date of Patent: Jan. 3, 1995

[54] FISHING FLOAT

[76] Inventor: James W. Gibney, Sr., 5318 Cherry Ave., Cocoa, Fla. 32927

[21] Appl. No.: 155,189

[22] Filed: Nov. 22, 1993

[51] Int. Cl.6 .............................................. A01K 93/00
[52] U.S. Cl. ..................................................... 43/44.91
[58] Field of Search ..................... 43/44.91, 44.9, 44.92

[56] References Cited

U.S. PATENT DOCUMENTS

| | | | |
|---|---|---|---|
| 2,829,464 | 4/1958 | Pettit, Jr. et al. | 43/44.91 |
| 4,656,777 | 4/1987 | Fernbach | 43/44.9 |
| 5,105,576 | 4/1992 | Kohus | 43/44.92 |
| 5,241,774 | 9/1993 | Rayburn | 43/44.9 |

Primary Examiner—Kurt C. Rowan
Assistant Examiner—Jeanne M. Elpel
Attorney, Agent, or Firm—Macdonald J. Wiggins

[57] ABSTRACT

A fishing float includes a buoyant body having a central opening therethrough and a longitudinal body slot in an outer surface of the body. A rod through the opening includes a disk at each end thereof, each disk having curved slots. A fishing line is inserted in the body slot and the disk slots, and the rod rotated with respect to the body to thereby captivate the line between the disks and the outer surface of the body.

10 Claims, 2 Drawing Sheets

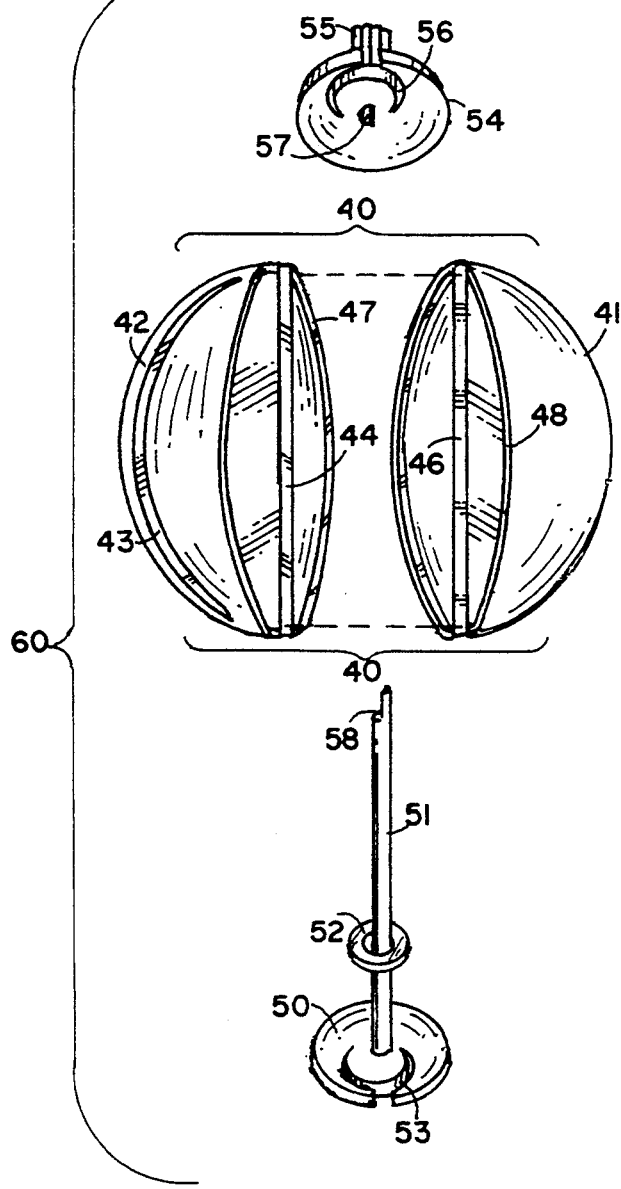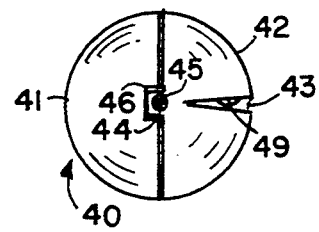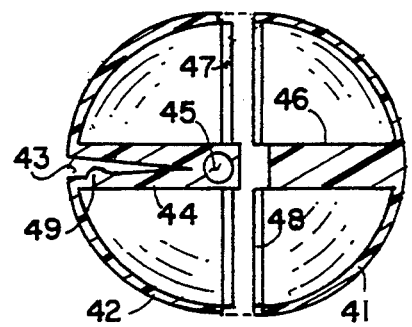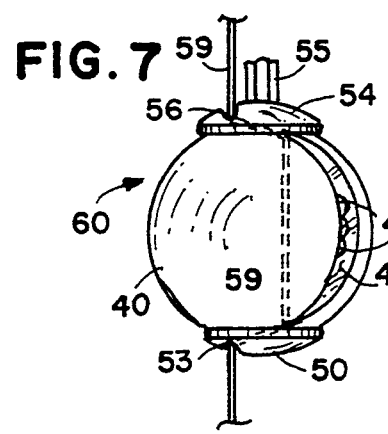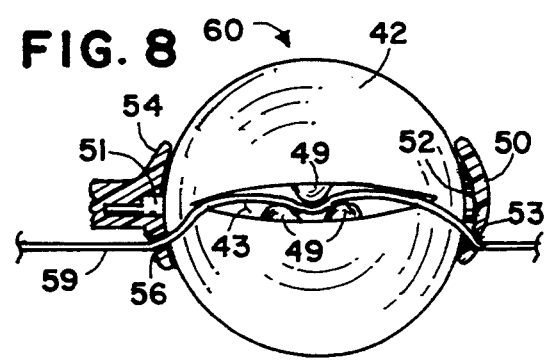

FISHING FLOAT

BACKGROUND OF THE INVENTION

1. Field of the Invention

The present invention relates to fishing floats, and more particularly, to a float that permits easy attachment to a fishing line and provides ease of adjustment of the position of the float along the line.

2. Description of the Prior Art

Fishing floats, or bobbers, are widely used in pole fishing and the like. A large number of designs for such floats have been proposed in the past. Typical prior art floats are disclosed in the following U.S. patents:

U.S. Pat. No. 2,001,241 to De Vries;
U.S. Pat. No. 2,315,048 to Croft;
U.S. Pat. No. 2,572,340 to Hockenhull;
U.S. Pat. No. 2,575,832 to Perry;
U.S. Pat. No. 2,578,874 to Zaikoski;
U.S. Pat. No. 2,582,619 to Blockinger; and
U.S. Pat. No. 4,563,831 to Gibney.

Ideally, a float, or bobber, should be a very low cost device that is quickly and easily attached to a fishing line, and which can be moved along the line to a desired position yet will not slip once adjusted nor will be dislodged when caught in debris and the like. Floats are known that can be attached without tying, but require the use of insertable plugs, external hook devices, and complex inserts. such designs appear to be expensive to produce in some cases.

Thus, there is a need for a low cost fishing float that is easy to attach to a line, simple to adjust its position along the line, and can be securely locked at a desired position.

SUMMARY OF THE INVENTION

The present invention fulfills the above noted need. One implementation uses a buoyant float body in the form of an inverted frustum having a vertical radial slot slightly wider than a desired fishing line. A vertical rod is inserted through a central axis vertical opening through the body. An upper cap disk is fixedly attached to the upper end of the rod, and a lower cap disk is fixedly attached to a lower end of the rod, with means to rotate the upper disk by hand.

A T-shaped radial slot is cut into each disk with the slots aligned. The body of the float is preferably formed of a slightly compressible material such as Styrofoam ®, expanded polystyrene, or cork. The two cap disks are mounted to provide friction between the inner surfaces thereof and the ends of the body. The cap disks and rod can be rotated by grasping one of the cap disks, holding the body, and thereafter rotating the cap disk, In use, the slots in the cap disk are aligned with the body slot. The fishing line is then seated in the slot formed by the cap disk and body slots. The body is grasped with one hand, and the upper cap disk rotated with the other hand for about one-quarter of a revolution. This action causes the line to be caught in the foot portions of the T-shaped disk slots, and bent parallel with the upper end and lower end surfaces of the body. The friction between these upper and lower surfaces with the inner faces of the cap disks grip the line. The greater the rotation of the cap disks with respect to the body, the greater the friction, thereby preventing slipping of the float along the line. The float position along the line can be easily adjusted by realigning the cap and body slots.

In another implementation of the invention, the float body is formed from two essentially hollow plastic hemispheres joined to form a sphere. A slot in one of the hemispheres is provided to accept the fish line. A central web within the sphere includes an opening extending from a point on the sphere to an opposite point thereby defining a central axis of the sphere. A rod extends through the axis opening. A small disk, formed to match the contour of the sphere, is attached at each end of the rod, with one of the disks including a small knob used to rotate the rod. Each disk includes radial and circumferential slots therein, with the radial slots aligned.

To attach a line to the spherical float, the knob is rotated to bring the radial slots in alignment with the body slot. The line is placed in the aligned slots, and the knob rotated to cause the line to be captivated between the inner surface of the end disks and the exterior surface of the spherical body. Thus, the spherical float is quickly attached to a line, easily adjusted to a desired position, and quickly and easily locked in that position. The float can also be quickly and easily removed from the line.

It is therefore a principal object of the invention to provide a low cost, simple to use, fishing float in which the position along a line is easily adjustable, and the float is easily locked in the desired position.

It is another object of the invention to provide a fishing float in which a fishing line is attached by dropping the line into a slot and twisting a disk.

It is still a further object of the invention to provide a fishing float in which a line can be quickly and easily attached to a fishing line, can be moved and locked in a desired position along the line, and can be quickly and easily removed from the line.

These and other objects and advantages of the invention will become apparent from the following detailed description when read in conjunction with the drawings.

BRIEF DESCRIPTION OF THE DRAWINGS

FIG. 4 is an exploded view of an alternative implementation of the invention;

FIG. 5 is a top view of the spherical body of the fishing float of FIG. 4;

FIG. 6 is a cross-sectional view of the spherical body of the fishing float of FIG. 4;

FIG. 7 is a view of an assembled fishing float of FIG. 4 in place on a fishing line; and FIG. 8 is a view of the fishing float of FIG. 7 in a position to show details of the line position.

DETAILED DESCRIPTION OF THE PREFERRED EMBODIMENT

Figure 1:
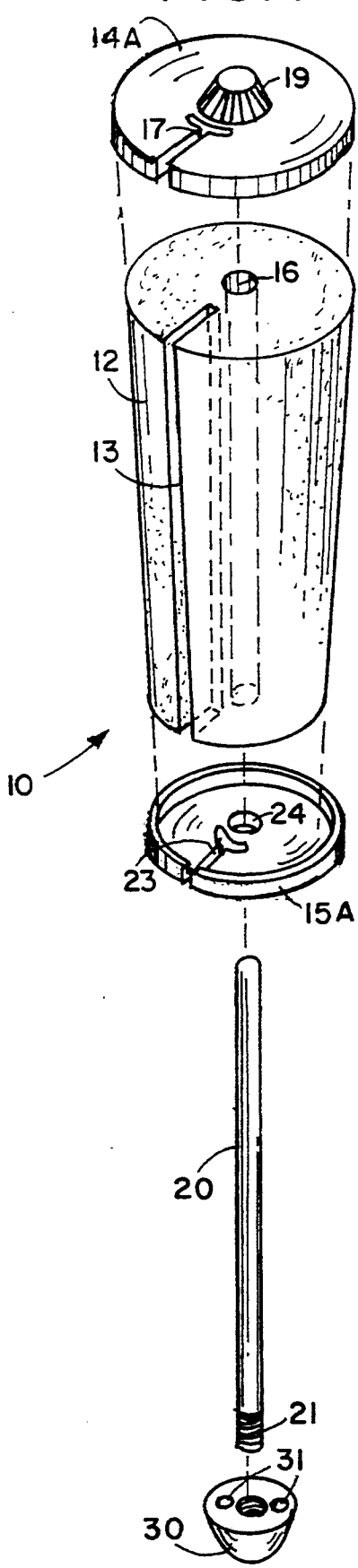
FIG. 1 is an exploded view of a first implementation of the fishing float in accordance with the invention.

The improved fishing float 10 of a first embodiment of the invention is shown in an exploded view in FIG. 1. A body 12 is preferably an inverted frustum of any desired height, typically in the range of 2 to 6 inches. Body 12 is formed of any material buoyant in water, such as Styroform®, expanded polystyrene, cork, or balsa wood. Alternatively, body 12 may be in the form of a hollow closed volume with a thin plastic outer surface. Body 12 has a central longitudinal opening extending through the body, and a longitudinal slot 13 extending along the external surface thereof. Slot 13 extends radially toward central opening 16. Although FIG. 1 shows a frustum having a circular cross section, other cross sections, such as hexagonal, are suitable.

A circular planar cap disk 14A is disposed at the upper end of body 12, and has diameter slightly larger that the diameter of the top surface of body 12 to permit cap disk to be easily grasped as discussed hereinafter. A knurled knob 19 may be attached to or molded into cap disk 14A to form a grip for the fingers. A radial slot 17 is formed in cap disk 14A and has a short circumferential extensions at the inner end thereof providing a "T" shape. Circular planar cap disk 15A is of similar construction to that of cap disk 14A, and is disposed at the lower end of body 12. Disk 15A includes a central opening 24, and a radial slot 23 having short circumferental extensions at the inner end thereof, forming a "T" shape. As will be understood, the lengths of slots 17, 23 are selected to match the depth of slot 13 of body 12.

A central rod 20 is provided having a threaded end 21. Rod 20 is preferably formed of plastic; however, other materials are suitable. Float 10 is assembled by inserting rod 20 through openings 24, 16, and into cap disk 14 and knob 19, such that slots 17 and 23 are aligned. Cap disk 14A and knob 19 include a central hole (not shown) for the upper end of rod 20 to extend into. Cap disks 14A, 15A are permanently attached to rod 20 by cementing, plastic welding, or the like. As previously mentioned, cap disk 14A may be rotated by knob 19, causing cap disk 15A to also rotate. To enable float 10 to float in water with its lower end down, a cap 30, which may formed of plastic, has one or more metal ball weights 31 inserted into the top surfaces thereof. Cap 30 is threaded onto a threaded end 21 of rod 20. As may now be noted, the height of the float in water may be adjusted by changing the weight of cap 30 and weights 31.

Figure 2:
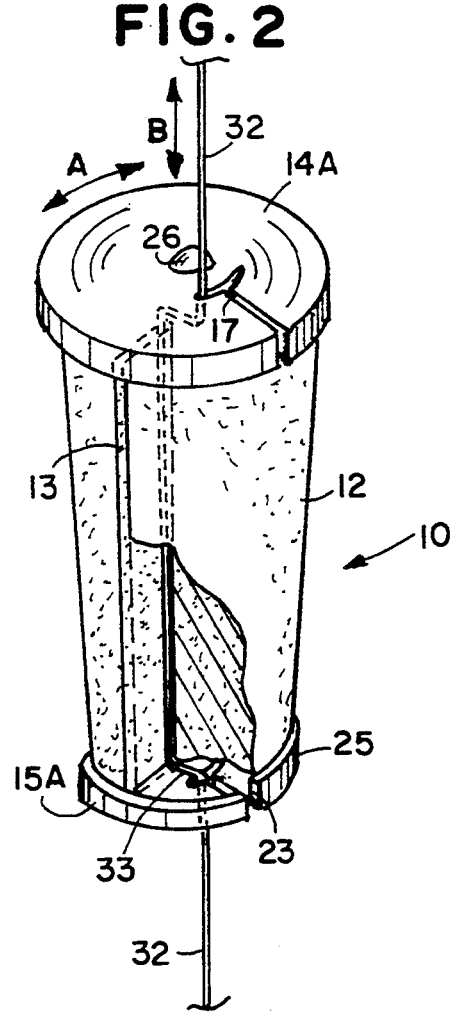
FIG. 2 is a perspective view of the float of FIG. 1 attached to a line, and partially cut away to show the position of the line.

Turning now to FIG. 2, a perspective view of an assembled float 10 having an alternative design for upper cap disk 14A is shown partially cut away to illustrate the use and operation thereof. Rod 20 (not seen) is attached to upper and caplower cap disks 14A and 15A by a suitable cement as indicated at 26. For example, where rod 20 and cap disks 14A and 15A are of plastic, a plastic welding cement can be used. Cap disks 14A ant 15A have knurled edges 25 to provide finger grips. In use, body 12 is grasped with one hand, and disk 14A grasped with the other hand. Disk 14A is then rotated, as indicated by arrow A to align slots 17 and 23. The fishing line 32 is then dropped into the aligned slots. Disk 14A is then rotated to bring line 32 into the circumferential T-shaped portions of slot 17 and 23. Rotation is continued to cause slot 13 of body 12 to force the captivated line to bend at the end of each circumferential slot portion, as indicated by line portion 33. Thus, these portions of line 32 are firmly held between each end of body 12 and its respective cap disk 14A, 15A.

Figure 3:
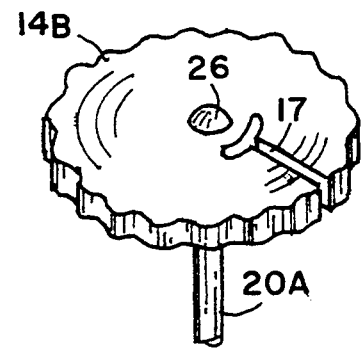
FIG. 3 is a perspective view of an alternative design of the upper cap disk of the invention.

FIG. 3 shows an alternative cap disk design 14B having a corrugated edge offering a good gripping surface.

Turning now to FIG. 4, an exploded view of an alternative embodiment of the invention is shown. This embodiment is a fishing float 40A having a spherical body portion 40 formed by joining hemispheres 41 and 42. Hemisphere 41 is formed by a plastic shell 48 having a central web 46. Hemisphere 42 is a plastic shell 47 having a central web 44 with a slot 43 formed in web 44. The circular edges of shell 47 are complementary to the edges of shell 41 such that the shells snap together to form a sphere. A bottom view of hemispheres 41 and 42 joined to form a sphere is shown in FIG. 5. An opening 45 is provided in the inner edge of web 44.

As indicated in FIG. 4, rod 51 is inserted through opening 45. The lower end of rod 51 has a lower cap disk, having an internal contour matching the outer contour of the sphere formed by shells 41 and 42, is attached thereto. A slot 53 is formed in lower cap disk 50, and a nylon washer 52 is disposed on rod 51. An upper cap disk 54, similar to disk 50, and having a mating slot 56 is shown. Rod 51 is inserted through opening 45 and upper cap 54 is pressed onto end 58 of rod 51. A knurled knob 55 attached to upper cap disk 54 is used to rotate rod 51.

Additional details of shells 41 and 42 are shown in the transverse cross sections of FIG. 6. As shown, web 44 has slot 43 formed therein. A set of ridges 49 is formed in the inner faces of slot 43.

FIG. 7 shows the fishing float 40 in use. The user rotates knob 55 to align slots 53 and 56 with body slot 43 and drops fishing line 59 into the slots. The user then rotates knob 55 to the position shown in FIG. 7, thereby captivating line 59 between the inner surfaces of disks 54, 50 and the exterior surfaces of hemispheres 41, 42. FIG. 8 shows a view of the float of FIG. 7 toward slot 43. Complementary ridges 49 are provided in the faces of slot 43 such that line 59 is captivated therebetween to provide some friction when adjusting the position of the float along line 59 prior to rotating caps 54, 50 to lock the line in place. As will be clear, the position of float 40 can be quickly adjusted during use, and can be easily removed for future use.

Although specific constructions of the fishing float of the invention have been disclosed, various modifications in materials and details of construction may be made thereto without departing from the spirit and scope of the invention.

I claim:

1. A fishing float comprising:
    a) a buoyant body having a central opening therethrough, and a longitudinal body slot in an outer surface of said body, said body slot extending toward said central opening;
    b) a rotatable rod inserted through said central opening of said body; and
    c) a pair of cap disks, one of said disks attached to each respective end of said rod, each of said disks having a radial slot including a short circumferential extension thereto at an inner end thereof, said radial slots alignable with said longitudinal body slot for accepting a fishing line;
    d) whereby said cap disk slots and said body slots are first aligned to permit a fishing line to be inserted into said body slot and said cap disk slots, and said cap disks thereafter rotatated from said aligned position to a non-aligned position, thereby causing said cap disks to grip said fishing line between inner surfaces of said cap disks and outer surfaces of said body.

2. The fishing float as defined in claim 1 in which said body is essentially spherical, and said cap disks are essentially circular.

3. The fishing float as defined in claim 2 in which said cap disks are formed to match a contour of said spherical body.

4. The fishing float as defined in claim 1 in which a first of said cap disks includes a knob for manually rotating said rod and said cap disks 5. The fishing float as defined in claim 1 in which said body is essentially a cylindrical frustrum, and said cap disks are circular.

6. The fishing float as defined in claim 1 which further includes a weight attached to an end of said rod.

7. The fishing float as defined in claim 1 in which said float body is formed of expanded polystyrene.

8. The fishing float as defined in claim 1 in which said body is formed of cork.

9. The fishing float as defined in claim 1 in which said float is formed of wood.

10. A fishing float comprising:
  a) an essentially spherical buoyant body formed of plastic having a central opening therethrough, and a longitudinal slot in an outer surface of siad body, said body slot extending radially toward said central opening for accepting a fishing line;
  b) a rotatable rod inserted through said central opening;
  c) a pair of cap disks attached to each respective ends of said rod, said rod and said cap disks having a frictional fit with said body;
  d) each of said cap disks having a radial slot and a short circumferential extension thereto, said radial slot initially aligned with said body slot; and
  e) one of said cap disks having a knob for manual rotation of said rod and said cap disks;
  f) whereby a fishing line is insertable into said longitudinal slot and said cap disk slots, said cap disks rotatable from said aligned position to thereby captivate said fishing line between said cap disks and said outer surface of said body.

* * * * *